US009837647B2

(12) United States Patent
Schmidt et al.

(10) Patent No.: US 9,837,647 B2
(45) Date of Patent: Dec. 5, 2017

(54) BATTERY PACK WITH AIR-TYPE COOLING

(71) Applicant: Robert Bosch GmbH, Stuttgart (DE)

(72) Inventors: Achim Schmidt, Hamburg (DE);
Christian Pankiewitz, Stuttgart (DE);
Lisa Lorenz, Stuttgart (DE); Jens Boehme, Gerlingen (DE); Matthias Stein, Korntal-Muenchingen (DE);
Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/603,854

(22) Filed: Jan. 23, 2015

(65) Prior Publication Data
US 2015/0207186 A1 Jul. 23, 2015

(30) Foreign Application Priority Data
Jan. 23, 2014 (DE) .................. 10 2014 201 165

(51) Int. Cl.
*H01M 2/12* (2006.01)
*H01M 10/6556* (2014.01)
*H01M 10/60* (2014.01)
*H01M 10/65* (2014.01)
*H01M 2/10* (2006.01)
*H01M 10/653* (2014.01)
*H01M 10/647* (2014.01)
*H01M 10/6557* (2014.01)
*H01M 10/613* (2014.01)

(52) U.S. Cl.
CPC ........... *H01M 2/12* (2013.01); *H01M 2/1077* (2013.01); *H01M 10/60* (2015.04); *H01M 10/613* (2015.04); *H01M 10/647* (2015.04); *H01M 10/65* (2015.04); *H01M 10/653* (2015.04); *H01M 10/6557* (2015.04)

(58) Field of Classification Search
CPC .... H01M 2/12; H01M 2/1077; H01M 10/653; H01M 10/613; H01M 10/6557; H01M 10/647; H01M 10/60; H01M 10/65
See application file for complete search history.

(56) References Cited

U.S. PATENT DOCUMENTS

| 6,689,510 | B1 | 2/2004 | Gow et al. |
| 2002/0012833 | A1 | 1/2002 | Gow et al. |
| 2007/0018610 | A1* | 1/2007 | Wegner ............... H01M 2/0212 320/112 |

(Continued)

FOREIGN PATENT DOCUMENTS

| EP | 2475028 | 7/2012 |
| EP | 2626924 | 8/2013 |

(Continued)

*Primary Examiner* — Milton I Cano
*Assistant Examiner* — Kiran Akhtar
(74) *Attorney, Agent, or Firm* — Michael Best & Friedrich LLP

(57) ABSTRACT

A battery module (19) having a number of electrically interconnected battery cells (10), wherein the individual battery cells (10) are temperature-controlled by means of a temperature control fluid (70). Between the battery cells (10), there extends a duct system (30, 62, 66, 68) through which the temperature control fluid (70) flows. The duct system (30, 62, 66, 68) is separated completely from a degassing system (16, 54) of the battery cells (10).

18 Claims, 3 Drawing Sheets

(56) References Cited

U.S. PATENT DOCUMENTS

| | | | |
|---|---|---|---|
| 2012/0009456 A1* | 1/2012 | Sohn | H01M 2/1077 |
| | | | 429/120 |
| 2012/0129024 A1 | 5/2012 | Marchio et al. | |
| 2013/0071706 A1 | 3/2013 | Lee | |
| 2014/0342197 A1* | 11/2014 | Andres | H01M 10/653 |
| | | | 429/53 |
| 2015/0037616 A1* | 2/2015 | Wyatt | H01M 10/625 |
| | | | 429/7 |

FOREIGN PATENT DOCUMENTS

| | | |
|---|---|---|
| KR | 1020060118797 | 11/2006 |
| WO | 2010148224 | 12/2010 |
| WO | 2013023847 | 2/2013 |

* cited by examiner

BATTERY PACK WITH AIR-TYPE COOLING

BACKGROUND OF THE INVENTION

The invention relates to a battery module having a number of electrically interconnected battery cells, wherein the individual battery cells are temperature-controlled by means of a temperature control fluid.

WO 2013/023847 A1 relates to a battery module with air-type cooling, and to a motor vehicle. The document discloses a battery module having a battery cell stack composed of at least two battery cells, wherein each battery cell is in contact with at least one air duct. The at least one air duct is integrated into the battery cell stack. In this way, despite a poor heat transfer coefficient, adequate cooling by means of an air stream of the battery cells is possible.

US 2012/00150003 A1 relates to a battery module. Said battery module comprises a number of rechargeable battery cells, and a housing which accommodates the rechargeable battery cells. First heat dissipation fins project from the housing and have a polygonal shape or a closed geometry. Furthermore, second heat dissipation fins project from the housing, which second heat dissipation fins are designed such that they couple the first heat dissipation fins to one another.

U.S. Pat. No. 6,689,510 B1 relates to a monoblock battery arrangement with a countercurrent cooling configuration. A multi-cell monoblock battery comprises a number of electrochemical cells which are arranged in a battery housing. The battery housing comprises one or more cell partitions which divide the interior of the housing into a number of cell-accommodating compartments in which the electrochemical cells are accommodated. It is preferable for one or more cooling ducts to be situated in the at least one cell partition implemented in the interior of the housing.

KR 2006 011 8797 relates to a battery module. The battery module according to said solution exhibits high heat dissipation capability and is very well insulated; furthermore, it has a reduced weight in relation to conventional battery modules. The battery module comprises a number of battery cells which are arranged at regular intervals. Walls are situated between the individual battery cells. A line for a heat-transporting medium is provided, said line being manufactured from a magnesium alloy. The walls are manufactured from a magnesium alloy with aluminum, zinc and zirconium and a small fraction of rare earths. The zirconium fraction within the magnesium alloy is between 2.0 wt % and 10 wt %.

Lithium-ion or lithium-polymer batteries warm up in particular when outputting energy. An optimum operating temperature of such battery systems lies in the region of approximately 25° C. Above an operating temperature of approximately 40° C., the service life of such battery systems is reduced considerably. Temperature changes and charging and discharging cycles lead to a decrease in capacity, and to an increase in the self-discharge of such batteries. The service life demands of 10 years and longer that are placed on such battery systems can thus be satisfied only with adequate thermal conditioning.

If more heat is generated in a battery cell than can be discharged to the surroundings, this can result in "thermal runaway", with undesired consequences. This means that there is a need for an active, high-performance thermal management system for lithium-ion and lithium-polymer batteries, which thermal management system heats the battery cells at low temperatures and cools the battery cells at higher temperatures.

It must also be mentioned that, in the presence of a high pressure in a lithium-ion or lithium-polymer battery cell, a burst valve opens. Emerging undesired gases, which are at temperatures of greater than 600° C., should not pass into the vehicle interior of an electric or hybrid vehicle.

SUMMARY OF THE INVENTION

According to the invention, a battery module is proposed which comprises a number of electrically interconnected battery cells. The individual battery cells are temperature-controlled by means of an air flow which flows through ducts which extend substantially along the battery cells. The battery cells are thermally coupled by means of the ducts, wherein the ducts have a flow cross section which is bounded by a duct wall which has a variable wall width profile.

In an extremely advantageous refinement with regard to the strength of the air ducts, which are preferably manufactured from an aluminum material or an aluminum alloy, the variable wall thickness of the ducts through which temperature-control air flows follows a hyperbolic profile, in particular a hyperbolic cosine (cos h) profile. Aluminum profiles from which the ducts are manufactured can be produced most effectively and most inexpensively in terms of manufacture by extrusion processes. The variable flow cross section, through which the temperature-control fluid, that is to say the cooling air, flows, of the ducts is—with respect to the height of the ducts accommodated between the individual battery cells—designed to be variable in relation to the duct height. For this purpose, the ducts through which the cooling air flows are narrower in their upper and lower regions than, for example, in the center, where the ducts have their maximum width.

The ducts, which are manufactured from an aluminum material or an aluminum alloy, are electrically insulated, for which purpose use may be made in particular of an electrically insulating lacquer or an electrically insulating film.

Furthermore, the ducts are sealed off with respect to the battery cells, in particular the side walls of the batteries in the battery module, by means of a sealing compound or adhesive beads or the like, such that any hazardous gases escaping from the battery cells do not pass into the ducts that are connected to the passenger compartment in which the vehicle occupants are situated. The temperature-control air used for the temperature control of the battery cells in the proposed air-type temperature-control system originates from said passenger compartment. In a refinement of the concept on which the invention is based, an average wall thickness of the duct wall of the ducts—in relation to the vertical direction of the flow cross section—is substantially in the region of 3 mm. The ducts through which the temperature-control fluid, for example cooling air, flows extend along the side surfaces of the battery cell casing. The battery cells have burst valves which constitute a predetermined breaking point of the battery casing for degassing purposes, which burst valves issue directly into a degassing duct which extends through the housing of the battery module.

In an advantageous possible embodiment of the concept on which the invention is based, the ducts through which the temperature-control fluid flows can be formed into side walls of a battery cell holder. The battery cell holder comprises not only the side walls but also a rear wall and a front wall, wherein the side walls run through the battery cell holder such that a number of battery cell compartments is realized, which battery cell compartments accommodate individual battery cells. The side walls of the battery cell holder are in this case designed so as to have projecting lengths at each of their ends, which projecting lengths protrude beyond the front walls and rear walls arranged perpendicular to the side walls. The projecting lengths firstly greatly simplify the production of the battery cell holder, and secondly, reliable separation of temperature-control ducts and degassing ducts is possible. The production of adhesive beads or weld seams, and embossment of the rear wall and front wall with the respective side walls, can, with the formation of the projecting lengths, be realized in a significantly more reliable manner in process terms, such that reliable joining of the rear wall, front wall and side wall, and thus reliable sealing of degassing ducts and temperature-control flow ducts, can be realized.

The battery cell compartments, on their surface pointing in each case toward a battery cell, have an electrically insulating surface which may be implemented as a film or lacquer.

The battery module proposed according to the invention comprises at least one air duct which is connected to the passenger compartment of a hybrid or electric vehicle. By means of a fan, air is conveyed out of the passenger compartment into the ducts which extend between the individual battery cells of a battery module or which extend through side walls of a battery cell holder. A fan may be provided in a passenger compartment in order to blow or draw the temperature-control air through the ducts. The flow resistance in the air ducts is dependent on their width. In the case of an average gap width in the region of 3 mm, an optimum air flow with minimal pressure losses is realized. The fan may also be arranged downstream of the battery pack as viewed in the flow direction. A filter may be installed upstream of the battery pack; it is also possible for the temperature-control air, for example cooling air from the outside, to be drawn in.

The solution proposed according to the invention is distinguished by the advantage that the temperature-control fluid, in the present case cooling air, for the temperature control of the at least one battery module or multiple battery modules can be extracted from the air-conditioned vehicle interior of a hybrid, electric or fuel cell vehicle, yielding the possibility of considerable cost savings. By means of the solution proposed according to the invention, it is ensured that, in the event of degassing, no battery cell becomes connected to the vehicle interior compartment. With the solution proposed according to the invention, a considerable increase in the effectiveness of temperature control can be attained, because the temperature-control fluid is conducted laterally past the battery cells and not just under the battery cells. This means that flow passes around the side surfaces of the individual battery cells, which are generally considerably larger, in particular more than four times larger, than the base surfaces of the battery cells. For this reason, in the concept proposed according to the invention, with a flow of cooling air laterally around battery cells, significant removal of heat is possible. In the case of the cooling air concept, it must be taken into consideration that the specific heat capacity Cwater is more than four times greater than the specific heat capacity $C_{air}$ (at room temperature, $C_{water}$ is equal to 4.182 kJ/(kg·K), and $C_{air}$=1.005 kJ/(kg·K)).

By means of the solution proposed according to the invention, the individual battery cells are thermally coupled to one another by the ducts. In this way, reliable detection of the temperature of the battery cells is possible. Furthermore, by means of the solution proposed according to the invention, the need to attach temperature sensors to each one of the battery cells can be circumvented. Thermal coupling between the individual battery cells can be realized by means of the air ducts, which are preferably manufactured from a material with good heat-conducting properties, such as aluminum.

The ducts have a profile which preferably corresponds to a hyperbolic cosine (cos h) function. In this way, it is possible to realize very small wall thicknesses of the duct which is preferably manufactured as an extruded profile, said wall thicknesses being substantially in the region of 3 mm. Owing to the selected hyperbolic cosine function, it is possible to mechanically realize high strength with respect to lateral pressure, such that the profiles that have the ducts, when braced together, exhibit very high strength and can be braced against one another by means of tension straps. In the case of an average air gap width of approximately 3 mm, optimum flow conditions are retained with regard to the design of a fan which conveys the cooling air flow. The individual battery cells may also be accommodated in and held by a battery cell holder which serves, in effect, as a grid composed of air ducts. The ducts are sealed off with respect to the battery cell casings by means of a thermally stable dispenser seal. In the case of the design variant proposed according to the invention, in which the ducts run through side walls of a battery cell holder composed of aluminum, projecting lengths of the side surfaces protrude beyond the front and rear walls. It is ensured in this way that, at their passages through the front and rear walls, and also through the respective module front wall and module rear wall, reliable sealing at passage points can be realized with an electrically conductive sealing and adhesive compound. A self-contained temperature-control system is realized in this way.

By means of the solution proposed according to the invention, the space or the duct in which degassing of a battery cell can be realized is separated from the space or the duct from which the battery cells or the battery modules can be temperature-controlled, in particular cooled, by means of air of the vehicle originating from the passenger compartment. The sealing between said spaces or said ducts, for example at the battery cell holder, can be implemented in a reliable manner in process terms through formation of projecting lengths on the side walls formed on those walls of the battery cell holder which are to be joined together.

BRIEF DESCRIPTION OF THE DRAWINGS

The invention will be described in more detail below on the basis of the drawing, in which.

DETAILED DESCRIPTION

Figure 1:
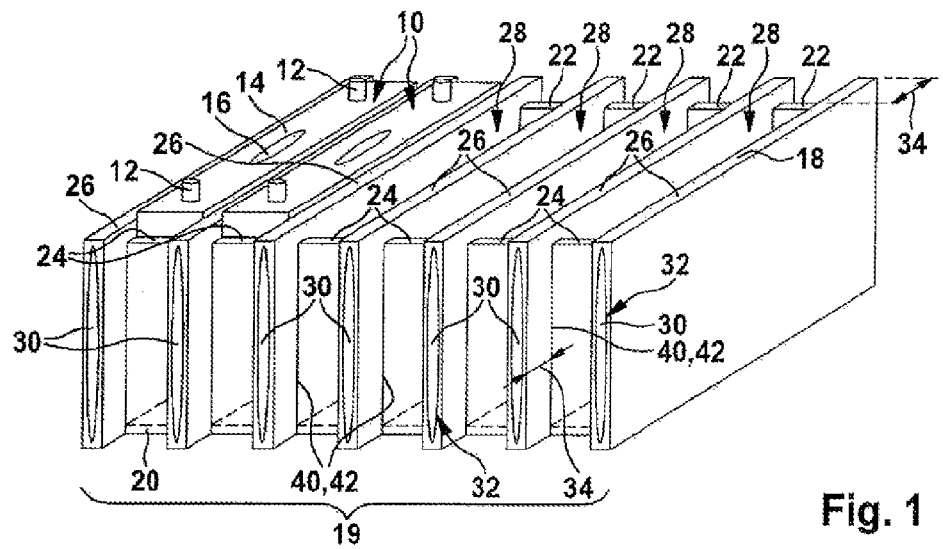
FIG. 1 shows a perspective plan view of a battery cell holder which has multiple battery compartments for battery cells.

The illustration in FIG. 1 shows, in a perspective plan view, a battery cell holder which comprises individual battery cell compartments in which the battery cells of a battery module are accommodated.

FIG. 1 shows a battery module 19 which comprises a number of battery cells 10. The individual battery cells 10 each have cell terminals 12 which are arranged on a top side 14 of the battery cells 10. On the battery cell top side 14, there is situated a burst valve 16 which constitutes a predetermined breaking point of the battery cell housing, via which undesired degassing of the battery cell 10 can take place. The individual battery cells 10 are accommodated in an upright position in a battery cell holder 18 which is manufactured from aluminum or an aluminum alloy or from some other material which has good heat conduction characteristics.

The battery cell holder 18 has a base 20; individual battery cell compartments 28 for accommodating the battery cells 10 are separated from one another by a rear wall 22 and a front wall 24 and side walls 26. Ducts 30 extend in each case through the side walls 26, through which ducts a temperature control fluid, which in the proposed solution is air, flows. The ducts 30 each have a flow cross section 32.

In FIG. 1, the reference 34 denotes projecting lengths by which the individual side walls 26 protrude in each case beyond the front wall 24 and the rear wall 22 of the individual battery cell compartments 28. By means of the projecting lengths 34, the production of a seal 40, for example as an adhesive bead or weld seams 42 between the front and side walls 24, 26 or rear walls and side walls 22, 26, is improved considerably in process terms.

In the perspective view as per FIG. 1, it can be seen that the flow cross sections 32, which are in a substantially vertical orientation, extend through the side walls 26. The flow cross section 32 of the ducts 30 has a maximum width in the center and has a narrowest width in each case at the top end and at the bottom end, as will be described in more detail below.

Figure 2:
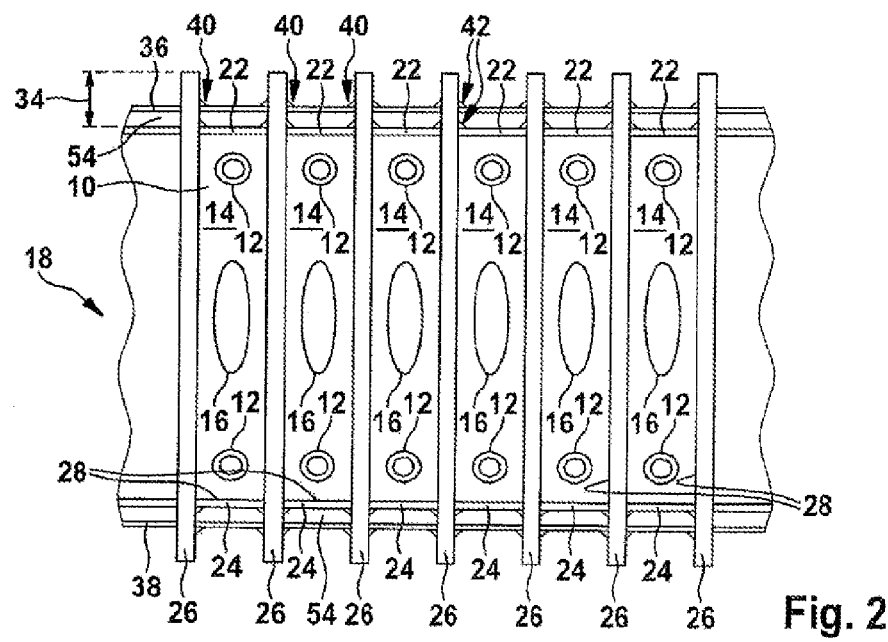
FIG. 2 shows a plan view of the battery cell holder, with battery cells accommodated therein, from the top side.

The illustration in FIG. 2 shows a plan view of the battery cell holder as per the illustration in FIG. 1, with battery cells accommodated in individual battery cell compartments.

In FIG. 2 it is possible to see the projecting lengths 34 by which the side walls 26, through which the ducts 30 (not illustrated in FIG. 2 as they run in the side walls 26) extend, protrude beyond the rear wall 22 and the front wall 24 of each battery cell compartment 28. A battery cell 10 is situated in each of the battery cell compartments 28. The air required for the temperature control of the battery cells 10 flows in from the passenger compartment of the vehicle through the ducts 30 that run in the side walls 26. Degassing ducts 54, which are only partially illustrated in the illustration of FIG. 2, are separated from the side walls 26 by seals 42 and 40. Said degassing ducts run above the top side 14 of the individual battery cells 10, above the drawing plane illustrated in the plan view in FIG. 2. Owing to the projecting lengths 34 at the ends of the respective side walls 26, it is possible for the degassing ducts 54, which are formed by the module rear wall 36 and the rear wall 22 at one side and by the module front wall 38 and the front wall 24 at the other side, to be sealed off with respect to the outlet ducts 30.

From the plan view in FIG. 2, it can be seen that each of the battery cells 10 accommodated in the battery cell compartments 28 has, on its top side 14, two cell terminals 12, that is to say a positive terminal and a negative terminal, for electrical interconnection. For completeness, it is mentioned here that those surfaces of the battery cell compartments 28 of the battery cell holder 18 which face toward the battery cells 10 to be accommodated are, in FIGS. 1 and 2, provided with an electrically insulating surface, for example a lacquer. It is also possible for the battery cells 10 themselves to be provided with an electrically insulating surface, which may likewise be in the form of a lacquer or film.

The battery cells 10 of lithium-ion or lithium-polymer battery modules 19, for example of a boost recuperation system (BRS), are held securely by the battery cell holder 18, and are located in position in the downward direction by the base and on all four sides by the rear walls 22, the front walls 24 and the side walls 26. Furthermore, the battery cell holder 18 as per FIGS. 1 and 2 also provides protection against mechanical deformation or damage, for example in the event of an accident.

Figure 3:
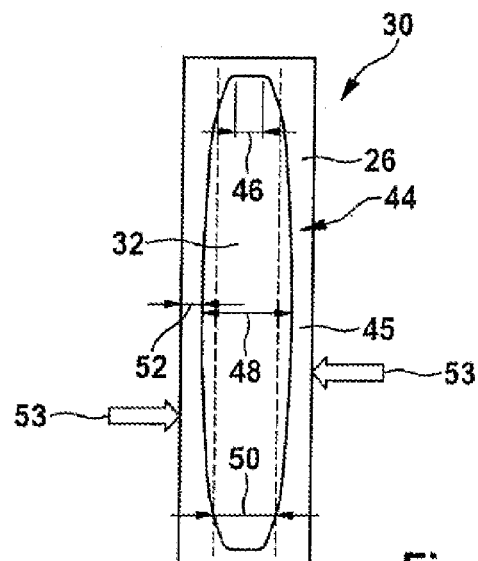
FIG. 3 shows the illustration of a duct composed of an aluminum or aluminum alloy extruded profile in an enlarged illustration.

FIG. 3 shows, on an enlarged scale, a section through a duct through which cooling air flows.

From the illustration of FIG. 3, it can be seen that the individual side walls 26 of the battery cell holder 18 each have ducts 30. The ducts 30 comprise a flow cross section 32 which substantially follows a hyperbolic function, for example a hyperbolic cosine profile 44. This yields a shape of the flow cross section 32 which, on the one hand, is characterized at the top of the duct 30 and at the base of the duct 30 by a first, relatively narrow duct width 46 in the region of 2 mm, and which, approximately centrally, has a maximum duct width 48 which is in the region of approximately 4 mm. All in all, the result is an average air gap width 50 in the region of 3 mm. The average duct width of 3 mm is advantageous, cf. the p/d diagram in FIG. 5, because that value yields an adequately low pressure loss for which a fan for delivering temperature-control air can be designed.

The contour, that is to say that which follows a hyperbolic cosine profile 44, offers extremely high mechanical strength with regard to a laterally acting pressure for a given average wall thickness of approximately 1 mm of duct walls 45 which delimit the flow cross section 32, wherein an average air gap width 50 is in the region of 3 mm, whereas an average wall thickness 52 remains in the region of 1 mm. By means of the cross section-delimiting inner contour of the side wall 26, one attains, even with small wall thicknesses—on average approximately 1 mm—of the aluminum or of an aluminum alloy, the mechanically highest strength with regard to laterally acting lateral pressure 53, such that the individual battery cells 10 can be braced together, for prevention of winding expansion, by means of tension straps. It is also possible for a multiplicity of ducts 30 to be formed in the side walls 26, for example so as to be arranged one above the other, said ducts likewise having a cos h profile 44 with regard to the duct wall contour. This not only increases the rigidity with respect to lateral pressure 53, but also the surface area available for heat transfer.

Figure 4:
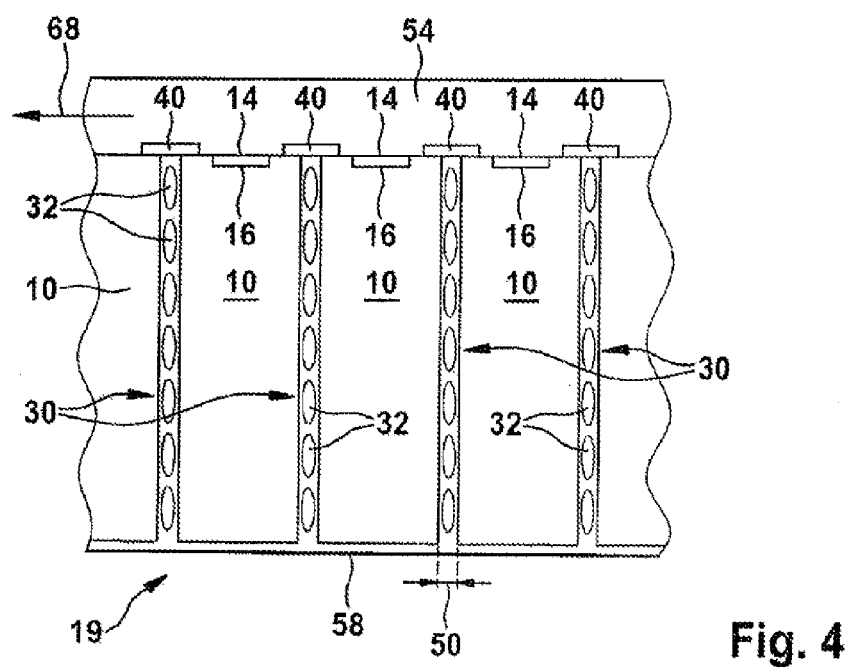
FIG. 4 shows the profile of air ducts between individual battery cells of a battery module.

FIG. 4 shows a view of a battery module which has multiple battery cells, the burst valves of which issue into a common degassing duct.

FIG. 4 shows a battery module 19 which comprises a number of battery cells 10 which are configured so as to be situated adjacent to one another in an upended position. The ducts 30, through which the temperature-control fluid, in the present case air-conditioned cooling air from the passenger compartment of a vehicle, flows run between the mutually opposite side walls of the individual battery cells 10. In the upper region, that is to say on the top side 14 of the battery cells 10, said battery cells have burst valves 16, all of which issue into a common degassing duct 54 which extends through the housing for the battery module 19. Position 58 denotes an electrically insulated module base which forms the set-down surface for the battery cells 10, which are oriented substantially in a vertical installation position. Air-conditioned cooling air which is delivered from the passenger compartment of the hybrid, electric or fuel cell vehicle by means of a fan (not illustrated in any more detail) flows, perpendicular to the plane of the drawing, through the individual ducts 30 and passes over the relatively long side walls 26, likewise extending into the plane of the drawing, of the individual battery cells 10. Removal of heat from the battery cells 10 by means of an air flow which passes along the side walls thereof is significantly more effective, because the surface area passed over by the cooling medium is significantly larger than the base surface or the top surface of the battery cells 10, which are of rectangular configuration. FIG. 4 shows that, during a degassing process of a battery cell 10, the respective burst valve 16 opens out directly into the common degassing duct 54, which runs within the housing of the battery module 19 above the battery cells 10. The individual ducts 30, which run between the battery cells 10 in a substantially vertical arrangement and through which the temperature-control fluid flows, are separated from the common degassing duct 54 by the seals 40, thus ensuring separation of the common degassing duct 54, via which discharging 68 to the outside is realized, from the ducts 30 illustrated in FIG. 6 and from the air duct 62 from the passenger compartment of the vehicle.

Figure 5:
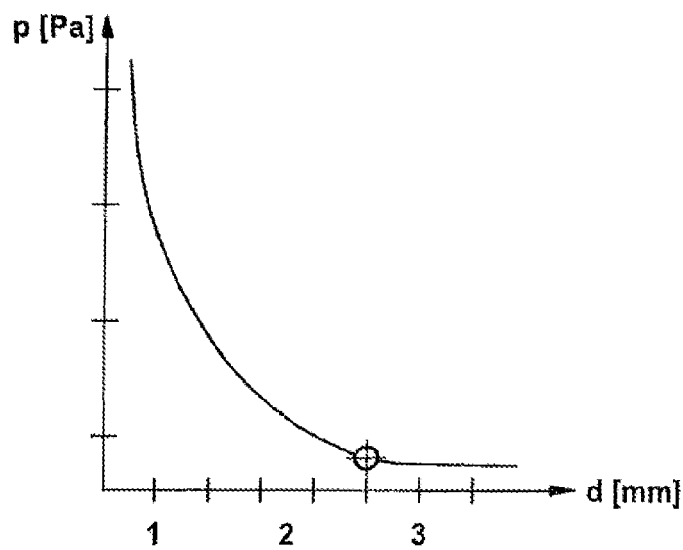
FIG. 5 shows the p/d characteristic curve with regard to the design of a delivery apparatus for an air-type temperature control concept.

The illustration in FIG. 5 shows the dependency of the pressure p and air gap width d. A fan is required for blowing temperature-controlled air through or for drawing temperature-controlled air in, said air being for example conditioned air which may be extracted from the interior of the passenger compartment. The resistance to the air flow through the ducts 30 is dependent on the average air gap width 50. The behavior qualitatively illustrated in FIG. 5 applies for the p/d dependency. Based on the diagram in FIG. 5, it is possible to arrive at an optimum configuration with regard to costs and the power of the required fan.

Figure 6:
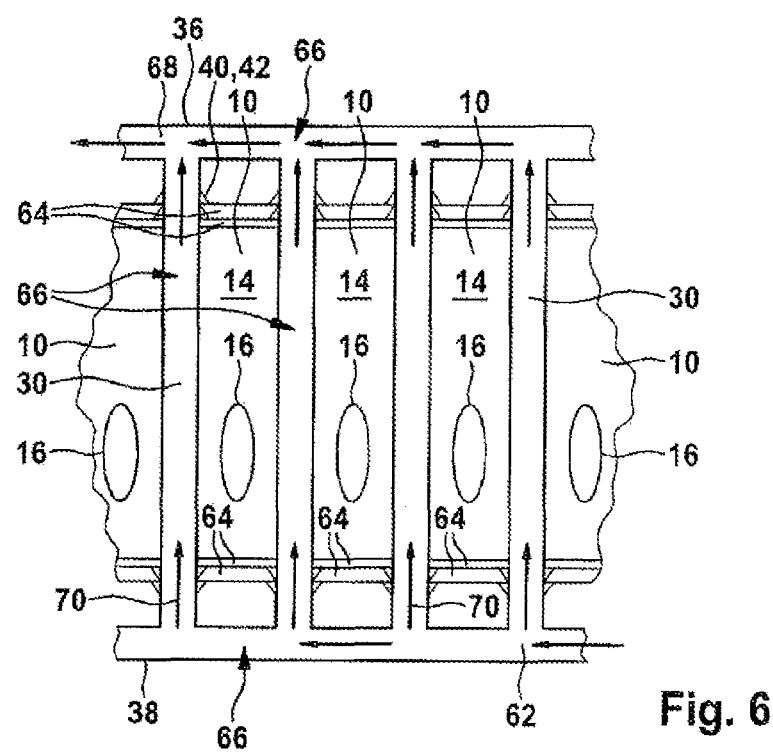
FIG. 6 is an illustration of a battery module with individual battery cells separated from one another by air gaps.

The plan view in FIG. 6 shows a battery module 19 in which individual battery cells separated from one another by ducts 30 are arranged.

As can be seen from FIG. 6, temperature-controlled air, which in the present case is used as cooling medium, flows into an air duct 62 under a delivery action imparted by means of a fan arranged for example in the passenger compartment or at some other location. The air duct 62 opens out in the interior of the battery module 19, in which the number of battery cells 10 is accommodated. The cooling air flows from the air duct 62 into the individual ducts 30, which are each delimited by side walls of the battery cells 10. In this case, the cooling air passes over the side walls of the battery cells 10, the extent of which is greater, by at least a factor of 4, than the surface made up of the top side 14 of the battery cells 10 and the bottom side thereof. Heat is removed from the battery cells 10 by the air flow 70 passing the ducts 30, wherein battery cell casings 64 are sealed off with respect to the ducts 30 by means of a seal 40, for example adhesive beads or weld seams 42 or the like. The air flow 70 emerges from the ducts 30 and flows into an exhaust air discharge line 68 leading out of the battery module 19. In the illustration of FIG. 6, the battery cells 10 are situated within a grid 66 which is formed from the air ducts 62, 30 and 68.

From the plan view as per FIG. 6, it can be seen that burst valves 16 are situated on the top side 14 of the battery cells 10. In the event of degassing, one of the battery cells 10 is degassed by virtue of the burst valve 16 opening into a common degassing duct 54 (compare the illustration as per FIG. 3) which runs in a plane of the drawing which lies above the plane of the drawing illustrated in FIG. 6. The battery casings 64 of the battery cells 10 are sealed off with respect to the ducts 30 which conduct the temperature-control medium by means of the seals 40 and 42, which in the illustration of FIG. 6 are illustrated as having been turned into the plane of the drawing. The seal 40 is realized in particular by means of adhesive beads 42 or by means of weld seams 42. In this way, it is possible to realize a separation between the guidance of the temperature-control fluid and the guidance of the degassing air, such that, in the event of degassing of a battery cell 10, the common degassing duct 54 is reliably separated from the passenger compartment of a hybrid, electric or fuel cell vehicle.

From the plan view of FIG. 6, it can also be seen that a burst valve 16 is situated on the top side 14 of each battery cell 10. Degassing of individual battery cells 10 takes place via the burst valves 16 into a common degassing duct 54 situated above the plane of the drawing in FIG. 6. Said degassing duct is illustrated in FIG. 4 as being situated above the battery cells 10. As can also be seen from FIG. 6, the seal 40 is implemented as an adhesive bead 42; it is also possible for the seal 40 to be implemented by means of an electrically conductive, thermally stable sealing compound which can be applied for example in a dispensing process. It is likewise possible for an electrically insulating coating to be applied to the inner sides, which point toward the battery cell 10, of the battery cell compartments 28 during the course of the dispensing process.

By means of the solution proposed according to the invention, it is possible to avoid the need to assign temperature sensors to each of the battery cells 10, which temperature sensors would then in turn have to be connected, with considerable signal processing outlay. In the case of the solution proposed according to the invention, it is possible, in the case of a sealingly encapsulated air-type temperature control system and correctly functioning degassing systems with at least one common degassing duct 54, for burst windows of all of the battery cells 10 to be separated by means of seals 40 of the ducts 30 in a battery pack with multiple battery modules 19, such that a passenger compartment from which temperature-control fluid is extracted is fully decoupled from the output system for undesired degassing. The encapsulated temperature-control system, equipped with a functioning degassing system fluidically separated therefrom, as discussed above, may also be accommodated below a driver's seat, below the rear seat or in the luggage compartment of a vehicle.

It can be seen from FIG. 6 that the air duct 62 from the passenger compartment is delimited by the module front wall 38 of the housing of the battery module 19, whereas the discharge line 68 is delimited by the module rear wall 36 of the housing of the battery module 19.

The performance and service life targets of a battery pack composed of the battery modules 19 configured according to the invention can be attained only by way of cooling with air-conditioned vehicle interior air, wherein an outside air temperature of for example +50° C. may prevail, or an outside temperature may be −30° C. By means of the solution proposed according to the invention, it is possible to easily realize an efficient air-type cooling concept using the air-conditioned air present in the passenger compartment.

The invention is not restricted to the exemplary embodiments described here and the aspects highlighted therein. Rather, within the scope defined by the claims, numerous modifications are possible which fall within the capabilities of a person skilled in the art.

What is claimed is:

1. A battery module (19) having a number of electrically interconnected battery cells (10), wherein individual battery cells (10) are temperature-controlled by means of a temperature control fluid (70), characterized in that, between the battery cells (10), there extends a duct system (30, 62, 66, 68) through which the temperature control fluid (70) flows, and in that the duct system (30, 62, 66, 68) is separated from a degassing system (16, 54) of the battery cells (10), wherein a duct wall (45) which delimits a flow cross section (32) of a duct has a variable wall thickness (46, 48), wherein the variable wall thickness (46, 48) follows a hyperbolic profile, and wherein the duct extends horizontally in the duct wall (45).

2. The battery module according to claim 1, characterized in that ducts (30) of the duct system (30, 62, 66, 68) are manufactured from aluminum, an aluminum alloy or a magnesium alloy or a plastic.

3. The battery module according to claim 1, characterized in that the ducts (30) of the duct system (30, 62, 66, 68) are electrically insulated.

4. A battery module having a number of electrically interconnected battery cells (10), wherein individual battery cells (10) are temperature-controlled by means of a temperature control fluid (70), wherein, between the battery cells (10), there extends a duct system (30, 62, 66, 68) through which the temperature control fluid (70) flows, and in that the duct system (30, 62, 66, 68) is separated from a degassing system (16, 54) of the battery cells (10), wherein an average wall thickness (52) of the ducts (30) is 3 mm, wherein a duct wall (45) which delimits a flow cross section (32) of a duct has a variable wall thickness (46, 48) and wherein the variable wall thickness (46, 48) follows a hyperbolic profile.

5. The battery module according to claim 1, characterized in that ducts (30) of the duct system extend along battery cell casings (64) of the battery cells (10).

6. The battery module according to claim 1, characterized in that ducts (30) of the duct system are formed into side walls (26) of a battery cell holder (18).

7. The battery module according to claim 1, characterized in that the duct system includes multiple ducts (30) that are situated one above the other and that run between the battery cells (10).

8. The battery module according to claim 1, characterized in that the degassing system (16, 54) comprises burst valves (16) which issue into a common degassing duct (54) of the battery module (19).

9. The battery module according to claim 8, characterized in that the common degassing duct (54) runs through a housing, delimited by a module rear wall (36) and a module front wall (38), of the battery module (19) above the battery cells (10).

10. The battery module according to claim 1, further comprising a battery cell holder (18) that has a number of battery cell compartments (28), the inner sides of which have an electrically insulating coating.

11. A battery module having a number of electrically interconnected battery cells (10), wherein individual battery cells (10) are temperature-controlled by means of a temperature control fluid (70), wherein, between the battery cells (10), there extends a duct system (30, 62, 66, 68) through which the temperature control fluid (70) flows, and in that the duct system (30, 62, 66, 68) is separated from a degassing system (16, 54) of the battery cells (10), wherein air ducts (62) of the duct system (30, 62, 66, 68) lead from the passenger compartment of a vehicle, through which the air ducts (62) direct air for the temperature control of the battery cells (10), wherein the air from the air ducts (62) is delivered into ducts (30) of the duct system, and wherein the air ducts (62) and the ducts (30) are closed off with respect to the degassing system (16, 54) by means of seals (40, 42), wherein a duct wall (45) which delimits a flow cross section (32) of a duct has a variable wall thickness (46, 48) and wherein the variable wall thickness (46, 48) follows a hyperbolic profile.

12. The battery module according to claim 1, characterized in that the duct system (30, 62, 66, 68) for the temperature control of the battery cells (10) is sealed off with respect to the degassing system (16, 54) of the battery module (19) by means of seals in the form of weld seams, adhesive beads or embossed portions which run along projecting lengths (34) of side walls (26) of the battery cell holder (18) or between battery cell casings (64).

13. The battery module according to claim 1, characterized in that the temperature control fluid is drawn or forced through ducts (30, 66) of the duct system.

14. The battery module according to claim 1, characterized in that the ducts (30) of the duct system (30, 62, 66, 68) are electrically insulated by a lacquer or a film.

15. The battery module according to claim 1, wherein the hyperbolic profile is a cos h profile (44).

16. The battery module according to claim 1, characterized in that ducts (30) of the duct system run between adjacent battery cells (10) within the battery module (19).

17. The battery module according to claim 1, characterized in that the duct system includes multiple ducts (30) that are situated one above the other and that run between the battery cells (10), which ducts have a circular geometry.

18. The battery module according to claim 1, wherein the temperature control fluid (70) is air flowing in from a passenger compartment of a vehicle.

* * * * *